3,801,521
SPINNABLE COMPOSITIONS OF NYLON AND A FATTY DIAMIDE, AND DRAWN ARTICLES SPUN THEREFROM
Walter J. Smith, Hopewell, Va., and John R. Bukey, Pottstown, Pa., assignors to The Firestone Tire & Rubber Company
No Drawing. Continuation of application Ser. No. 743,646, July 10, 1968, which is a division of application Ser. No. 483,318, Aug. 27, 1965, both now abandoned. This application Apr. 24, 1972, Ser. No. 247,061
Int. Cl. C08g 51/00, 51/44
U.S. Cl. 260—28
13 Claims

ABSTRACT OF THE DISCLOSURE

By incorporating by melt-blending certain diamides in predominantly nylon fiber-forming compositions, the fibers, filaments, yarn, cord, strapping and the like produced therefrom may be drawn at a draw ratio exceeding the draw ratio at break for the base polymeric material. The tensile strength of the product, as a result of the drawing operation, is greater than is obtainable from the base polymeric material. N,N'-ethylene bis-stearamide is a particularly suitable diamide for this purpose.

PRIOR APPLICATIONS

This application is a continuation of U.S. application Ser. No. 743,646 filed July 10, 1968, which in turn is a division of U.S. application Ser. No. 483,318, filed Aug. 27, 1965, both now abandoned.

This invention relates to polymeric materials having improved processability, to processes for rendering polymers of the nylon type more readily processable, and to bristles, filament, fiber, yarn, strapping, tire cord and the like products having improved properties.

In the production of articles such as yarn, cord, fiber, filament, strapping, etc., from materials of the nylon type, the products are subjected to stretching or drawing to increase their ultimate tensile strength. In general, the properties of such polymeric materials do not permit the use of high draw ratios, thereby limiting the final tensile strength obtainable in the products. Attempts to draw the products beyond certain limits adversely affects the quality of the product. Yarns which have been overdrawn, exhibit substantial filament breakage. Excessive drawing of nylon strapping leads to a general deterioration of the physical properties and to breakage of the formed product.

It has now been found that the inclusion in the polymeric materials of certain diamide additives prior to, or during, melt extrusion or spinning improves the melt rheology such that a higher draw ratio can be employed than was previously possible. The resulting product has a substantially increased ultimate tensile strength and is generally of superior properties.

The useful diamides

The diamides useful for the purposes of the present invention are those having one of the following general structures:

(A) 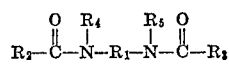

or (B) 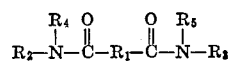

wherein:
$R_1$ is an alkylene group of from 2 to 12 carbons, preferably from 2 to 8 carbons, and may be straight or branched chain;
$R_2$ and $R_3$ are selected from the group consisting of alkyl, aralkyl and alicyclic groups containing from 2 to 30 carbons, either substituted or unsubstituted; the alkyl and alicyclic groups and the alkyl portion of the aralkyl groups may contain a minor degree of unsaturation; and
$R_4$ and $R_5$ are selected from the group consisting of hydrogen, methyl and $R_2$ and $R_3$.

Thus, the diamides useful in the present invention can be prepared by the reaction of alkylene diamines and monocarboxylic fatty acids or by the reaction of dicarboxylic acids and alkyl monoamines. The amines which may be employed in the preparation of the diamides used in the present invention may be either primary or secondary amines. Typical diamines include ethylenediamine, propylenediamine, butylenediamine, hexamethylenediamine, octamethylenediamine, decamethylenediamine, dodecamethylenediamine, etc. Typical monoamines useful in the preparation of the diamides include ethylamine, methylethylamine, diethylamine, butylamine, hexylamine, decylamine, as well as the higher molecular weight monoamines containing up to 30 carbon atoms. Typical fatty acids useful in the production of diamides include caproic, caprylic, capric, lauric, myristic, palmitic, stearic, arachidic, behenic, tetracosanoic, cerotinic, montanic, carnubic, etc. Typical dicarboxylic acids useful in the production of diamides of the present invention include succinic, glutaric, adipic acid, pimelic, suberic, azelaic, sebacic, etc.

The total number of carbon atoms in the diamide, the degree and type of substitution, and the degree of unsaturation must be such that the basic waxy character of the additive and the thermostability of the additive are maintained at the temperatures and pressures encountered during the extrusion or spinning of the polymer to which they are added.

Similarly, the particular diamide employed should be selected such that it will not exert an undesirable effect on the polymer to which it is added. Thus, the additive must be chemically stable with the polymeric materials to which it is to be added under the various conditions encountered during processing and must not react in a manner or to an extent to degrade or destroy the basic nature of either the polymeric material or the additive. The additive must be dispersible in the polymer melt and must not be substantially volatilized at the processing temperatures and pressures.

An additional requirement of the additive is that it be relatively incompatible with the polymer to which it is to be added. This incompatibility can be demonstrated by mixing the additive with the monomers from which the polymer is to be prepared: when the polymerization reaction is carried out without agitation, the additive will separate from the polymeric reaction product.

There are several guides to assist in selecting a particular diamide for the purposes of the present invention. If the total carbon content of the diamide is too low, the diamide will lose its basic waxy characteristic. If the total number of carbon atoms is too high, the diamide will tend to lose its thermostability and become subject to serious oxidation. In general, the diamide should contain at least 34 carbon atoms.

In general, the diamides used in the present invention should have a relatively low vapor pressure at 500° F. If the diamide forms visible bubbles in the polymer filaments as they are extruded from the spinneret, the vapor pressure of the diamide is too high and a diamide having a lower vapor pressure should be employed.

The only serious limitation on the degree of unsaturation which can be tolerated in the various groups attached to the diamide is the requirement that the diamide be stable. Minor amounts of ethylenic unsaturation do not cause substantial loss of stability. On the other hand, diamide containing highly unsaturated alkyl groups are unsuitable for use in the present invention. In general, there should be no more than one ethylenic unsaturation in any R group, no more than four ethylenic unsaturations in the diamide, and no ethylenic unsaturations in any R group of less than six carbons.

Groups which may be substituted on the various carbon-containing groups are well known in the art. In general, sulfate groups should be avoided, since they will cause degradation of the polymer. A moderate number of alcoholic hydroxy groups can be substituted on the R groups.

Particularly suitable diamides are those of the ethylene bis-stearamide type. A typical useful diamide of this type is sold commercially as "Acrowax C." This product is N,N'-ethylene bis-stearamide. This diamide provides exceptional properties in polymers to which it is added. The preferred diamides are those in which $R_4$ and $R_5$ are hydrogen or methyl when $R_2$ and $R_3$ are $C_6$ and higher.

The polymeric materials

The polymeric material employed for the purposes of the present invention comprises at least 60%, and preferably at least 65 to 70%, of a nylon. The balance of the polymeric material may comprise other compatible polymers or may comprise block sections of other polymers. Thus the polymeric material may be all nylon, physical blends with other polymeric materials, as well as block polymers and physical blends of block polymers.

The nylons which are useful in accordance with the present invention include any of nylons-4 to 10, including particularly, nylons-6 and 8, nylon-66, nylon-610, nylon-6I and nylon-6T. Typical nylons are identified in Table I.

TABLE I

| | |
|---|---|
| Nylon-4 | Polybutyrolactam. |
| Nylon-5 | Polyvalerolactam. |
| Nylon-6 | Polycaprolactam. |
| Nylon-7 | Polyenantholactam. |
| Nylon-6I | Polyhexamethylene isophthalamide-adipamide. |
| Nylon-6T | Polyhexamethylene terephthalamide. |
| Nylon-66 | Polyhexamethylene adipamide. |
| Nylon-610 | Polyhexamethylene sebacamide. |

As was noted above, it is not necessary that the predominant polymeric material, i.e., nylon, comprise uniform polymer macromolecules of a single polymer type. Block polymers of nylon may also be utilized, provided the total of nylon section of the macromolecules are such that nylon comprises at least 60% of the polymeric material.

Typical of other polymeric materials which may form sections of nylon block polymers include the acrylics, e.g., polymethyl methacrylate, polyethyl methacrylate, polyethyl acrylate, etc., polyacrylonitrile and the polystyrenes, e.g., polystyrene, polymethyl styrene, etc. The quantities of the various materials, which may be included with the nylon polymer, depend on the relative compatibilities of the materials. Thus, for example, styrene is not generally compatible with nylon in amounts in excess of about 5% of the total polymer.

In addition to the foregoing, physical blends of nylon with block polymers in which the nylon sections are less than 60% of the block polymer can be employed, provided that the total nylon content of the physical blend, including any corresponding block polymer sections, is at least 60% by weight. In addition to the block polymers and the block polymer blends, other useful polymeric materials include blends of nylon with compatible polymers including polyacrylonitrile, polycarbonates, such as that sold commercially as "Lexan" (General Electric), polyacrylates such as polyethyl acrylate and polymethyl acrylate, polymethacrylates such as polymethyl methcrylate and polyethyl methacrylate, polystyrene, polymethyl styrene and polydivinyl styrene. Again, however, the total nylon content of the polymeric material must be at least 60% by weight.

Additive dosage

In general, the amount of additive included in the polymeric material is in the range of about 0.1% to 2% by weight, dry basis, of the total nylon content. In a polymeric material which is essentially nylon, the preferred additive dosage is about 0.5% by weight.

Methods of incorporating the additive in the polymeric material

The polymeric material in solid form may be dusted with the additive prior to melt extrusion or spinning. Subsequent melt extrusion or melt spinning satisfactorily blends the additive into the polymeric material to provide a substantially uniform and homogeneous product. Similarly, a melt of the additive may be blended into solid polymeric material. In addition, both the additive and polymeric material may be first melted and the two melts blended prior to the extrusion or spinning step.

The additive may also be dissolved in a fugitive or non-fugitive solvent. By the term "fugitive solvent" is intended those solvents which, during the course of processing of the polymeric material, will vaporize or otherwise be removed from the polymeric material. Typical of such solvents are methanol, acetone, ethylene glycol and dimethyl sulfoxide. Non-fugitive solvents must be selected such that their presence in the final polymeric product will in no way diminish the desirable properties of the polymeric material. Many such non-fugitive solvents actually enhance the properties of the final product. Typical of these are the intermediate molecular weight glycols and polyhydric alcohols, e.g., triethylene glycol, as well as solvents such as anilinoethanol, mineral oil, etc.

Products

Poymeric material produced in accordance with the present invention may be suitably employed in the production of a number of useful products. All of the products are characterized as having been produced as the result of melt extrusion, melt spinning, with or without a subsequent drawing operation, or as the result of a melting operation followed by a drawing of the solidified product. Thus, in accordance with the present invention, bristles, filament, fiber, yarn and strapping have been satisfactorily produced from polymeric material of the present invention. It has been found possible to achieve superior properties in all of these products using the additive, as compared to these products from the same polymeric material without the additive.

EXAMPLES

In the examples which follow, the reduced viscosity of nylon was determined for a solution containing 0.25 gram of nylon dissolved in 25 milliliters of 97 to 100% sulfuric acid. Antioxidant stabilizers were generally included in the polymeric materials of the examples. Stabilizer A is a complex organic reaction product of diphenylamine and acetone. Stabilizer B is a mixture of copper acetate and ammonium chloride.

In each instance, the yarn produced in accordance with the examples comprises 136 filaments of 0.01 inch diameter. All of the physical properties given refer to the yarn unless otherwise stated. Thus, tenacity given in the examples is the break strength in grams divided by the yarn denier. The ultimate elongation (U.E.) represents the percent elongation at break for the yarn. The 10 pound elongation (10 #E) is the percent change from the initial length of the yarn when the yarn is subjected to a force of 10 pounds.

Example 1

Nylon-6 chips having a relative viscosity of 2.85, stabilized with Stabilizer A and dusted with Acrowax C in an amount to provide 0.5% of the distearamide on the nylon chips, were extruded at a temperature ranging from 460 to 505° F. and spun into yarn at a temperature of 510 to 515° F. at a head pressure of 1,000 p.s.i. The 6 inch diameter takeup roll operated at 1,100 r.p.m. The yarn was subjected to a standard draw-twist operation utilizing a plate heater with a steam temperature of 325 to 375° F. The overall draw ratio for the finished product was 4.84. The resulting yarn was 846 denier with a break strength of 7,841 grams, a tenacity of 9.27 grams per denier, an ultimate elongation of 16.2% and a 10 pound elongation of 8.2%. Attempts to spin and draw the same nylon without the diamide additive results in a product of extremely poor properties and appearance. In fact, such nylon cannot normally be subjected to an overall draw ratio greater than 4.5; a draw ratio of 4.4 is considered the maximum draw ratio for such nylon. The appearance of the nylon yarn containing the diamide obtained with a draw ratio of 4.84 was at least as good as that previously obtainable and the physical properties were generally significantly improved. Two-ply tire cord prepared from the yarn had an average ultimate tensile strength of 32.0 pounds.

Example 2

The procedure of Example 1 was repeated except that Stabilizer B was employed in place of Stabilizer A. The resulting yarn was 834 denier with a break strength of 7,519 grams, a tenacity of 9.02 grams per denier an ultimate elongation of 16.8% and a 10 pound elongation of 8.5%. Two-ply tire cord produced from the yarn had an average ultimate tensile strength of 31.2.

Example 3

Nylon-6 was continuously polymerized to a polymer of 3.09 relative viscosity and passed through a hot melt line to a spinneret. Stabilizer A and Acrowax C were dissolved in mineral oil to provide a solution containing one part of the diamide per part by weight of mineral oil. The solution was injected into the hot melt line in amount to provide 0.5% by weight of the diamide in the nylon. The melt was spun at 525° F. with an average head pressure of 700 p.s.i. The takeup roll speed was 1,150 r.p.m. The yarn was subjected to the usual draw-twist operation using a plate heater with a steam temperature of 350° F. The overall draw ratio was about 4.6. The resulting yarn was 838 denier with a break strength of 7,846 grams, a tenacity of 9.36 grams per denier, an ultimate elongation of 16.7% and a 10 pound elongation of 8.0%.

The two-ply tire cord prepared from the yarn had an average ultimate tensile strength of 32.4 pounds.

Example 4

Example 3 was repeated except that the nylon had a relative viscosity of 3.03 and Stabilizer B was used in place of Stabilizer A. In addition, the yarn was spun at 515° F. instead of the 525° F. of Example 3. The resulting yarn was 843 denier with a break strength of 7,967 grams, a tenacity of 9.45 grams per denier, an ultimate elongation of 16.9% and a 10 pound elongation of 8.4%.

Two-ply tire cord made from the yarn had an average tensile strength of 32.82 pounds.

Example 5

Nylon-6 of about 2.9 to 3.0 relative viscosity was treated with 0.25% of Acrowax C and extruded in the form of nylon strapping. The strapping was extruded at 530° F. at a screw speed of 34 r.p.m., quenched in hot water and annealed in a 9 foot oven at 1,200° F. Strapping drawn at a 4 to 1 draw ratio had a 600 pound tensile strength, an ultimate elongation of 29% and a tenacity of 3.5. Strapping prepared in the same manner but without the diamide had an ultimate tensile strength of 584 pounds and ultimate elongation of 28% and a tenacity of 3.3. When the strapping was drawn at a draw ratio of 5 to 1, the diamide containing strapping had an ultimate tensile strength of 603 pounds, an ultimate elongation of 26% and a tenacity of 3.5. Attempts to draw strapping containing no diamide at 5 to 1 draw ratio failed due to breakage of the strapping. The use of the higher draw ratio with the diamide-containing product resulted in a more dimensionally stable strap with a higher modulus than was possible with untreated nylon.

Example 6

Approximately 1,000 pounds of nylon-6 pellets were dusted with N,N'-ethylene bis-stearamide (Acrowax C) in an amount to provide 0.1% additive. The dusted pellets were then melt extruded into strands, which were cut into ⅛ inch chips. The chips were then melt extruded to provide 12 mil bristle. The resulting bristles had an ultimate tensile strength of 7.1 to 8.3 pounds and an ultimate elongation of 30 to 36%. This is to be compared to the National Plastics Quality Control specification 10 N for bristles which requires a tensile strength of 5.5 to 7.2 pounds and an ultimate elongation of 25%. Subsequent tests confirmed the unusually high tensile strength of this bristle.

In addition to the previously described polymeric materials which can be blended or polymerized with nylon, blends and/or block polymers with polyesters have also been found useful. These materials, as with those previously described, contain at least 60% nylon, but all or part of the balance may advantageously be polyester. The polyesters useful in the manner described are those of the type produced by the linear condensation of polyhydric alcohols and benzene-dicarboxylic acids, e.g. the phthalic acids. The invention is particularly useful with polyesters such as polyethylene terephthalate, polypropylene terephthalate, polyethylene isophthalate, polypropylene isophthalate, and blends and block polymers of the terephthalates and isophthalates.

The following example is typical of this aspect of the invention.

Example 7

Chips comprising a blend of 70% nylon-6 of 2.70 relative viscosity and 30% polyethylene terephthalate of 0.7 intrinsic viscosity were stabilzed with Stabilizer B. The polymeric material was then divided into two batches. The first batch was dusted with Acrowax C in an amount to provide 0.5% by weight of the diamide on the polymeric material. The chips were then spun at 530° F. No breaks occurred during spinning. The yarn was drawn across a plate heater with a steam temperature of 350° F. at an overall draw ratio of 5.37. The resulting yarn of 1,241 denier was of excellent quality, and had a break strength of 10,533 grams, a tenacity of 8.49 grams per denier, an ultimate elongation of 16.1% and a 10 pound elongation of 6.2%. Attempts to prepare yarn from the portion of the blend chips containing no diamide lead to a product of extremely poor quality. Serious breakage occurred during spinning and the tensile properties of the resulting yarn were generally about 7% lower than those obtained with the diamide-treated mixture.

As will be seen from the foregoing examples, the use of the specific class of diamides permit improvements in products produced from nylon materials with no loss in quality. Thus, it is possible to obtain an increase in tenacity of 0.5 to 1 gram per denier. The yarn exhibits better beaming performance, and a more uniform color is obtained in the beamed yarn.

While the invention has been illustrated in the foregoing examples with Acrowax C, the other diamides discussed previously are also useful. Thus, the several N,N'-alkylene bis-amides of fatty acids such as N,N'-alkylene bis-caproamide, N,N'-alkylene bis-heptanamide, N,N'-alkylene caprylamide, N,N'-alkylene bis-pelargonamide, N,N'-alkylene bis-capramide, N,N'-alkylene bis-undecanamide, N,N'-alkylene bis-lauramide, N,N'-alkylene bis-myristamide, N,N'-alkylene bis-palmitamide, N,N'-alkylene bis-arachidamide, N,N'-alkylene bis-behenamide, N,N'-alkylene bis-oleamide, and N,N'-alkylene bis-elaidamide may be used in place of Acrowax C.

The foregoing fatty acid diamides are particularly effective where the alkylene groups are ethylene, proplyene, butylene, pentene, hexene, heptene and octene. While the higher alkylene groups are also useful in the manner described in the examples, they are primarily useful with the diamides of the lower molecular weight fatty acids. Thus, for example, while N,N'-dodecene[dodecamethylene]bis-stearamide can be used, the dodecene derivative is more effective in diamides such as N,N'-dodecene bis-caproamide.

For the purposes of the present invention, the preferred diamides are those having a structure resembling that of N,N'-ethylene bis-stearamide and containing about the same number of carbon atoms. These diamides may be defined as substantially linear diamides having an empirical formula $C_nH_{2n}N_2O_2$ wherein $n$ is an integer of from 34 to 42. By "linear" is meant that there is little, if any, branching from either the carbon or nitrogen atoms of the diamide, and such branching as there is, is of a short-chain type. The preferred diamides of this class are those which are substantially symmetrical, i.e., the diamides are prepared from only a single monocarboxylic acid or single monoamine, or where mixed monocarboxylic acids or mixed monoamines are employed, the difference in length between the carbon chains is no more than a few carbons. i.e., two or three carbons. While short hydrocarbon chains can also be attached to the nitrogens of the fatty acid diamides, e.g., methyl, ethyl and propyl, longer chain groups tend to reduce the effectiveness of the diamides.

Similarly, the diamides formed by the reaction of a dicarboxylic acid with fatty monoamines are also useful, particularly those resembling N,N'-ethylene bis-stearamide are useful. Thus, the diamide formed by reaction of succinic acid and hexylamine, heptylamine, octylamine, nonylamine, decylamine, etc., are useful as are the reaction products of these monoamines with glutaric acid, adipic acid, pimelic acid, suberic acid, azelaic acid, sebacic acid, etc. Diamides such as those obtained by the reaction of septadecylamine with succinic acid can be advantageously employed.

Any of these diamides can be used advantageously in the production of fibers, filaments, strapping, yarn, cord, etc., from nylon, blends of polymers, block polymers and the like, as previously described. The components of the final products other than nylon should not exceed 40% and in general, should be 20% or less.

What is claimed is:

1. As an article of manufacture: filament, fiber, yarn, cord, strapping and like products formed from a melt-blended polymer composition comprising
    (a) at least 60% of fiber-forming nylon;
    (b) from about 0.1% up to about 2% by weight of a waxy, thermally stable diamide which is relatively incompatible with said nylon, said diamide being selected from the group consisting of:
    (i)

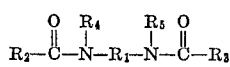

and (ii)

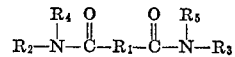

wherein:
    $R_1$ is an alkylene group of from 2 to 12 carbons,
    $R_2$ and $R_3$ are separately selected from the group consisting of alkyl, aralkyl and alicyclic groups free from substantial ethylenic unsaturation and containing from 2 to 30 carbons, and
    $R_4$ and $R_5$ are separately selected from the group consisting of hydrogen, methyl, $R_2$ and $R_3$,
    (c) the balance of said polymer composition comprising polymeric material compatible with said nylon; said polymeric material having been in its polymerized form at the time of the melt-blending of said diamide and said polymeric material, and said articles being drawn at a draw ratio exceeding the draw ratio at break of the base polymer composition not so melt-blended, and having a tensile strength as a result of drawing operation greater than is obtainable from the base polymer composition not so melt-blended.

2. An article in accordance with claim 1 wherein said diamide is substantially symmetrical.

3. An article of manufacture in accordance with claim 1 wherein said melt-blended polymer composition consists essentially of said nylon and said diamide.

4. An article in accordance with claim 3 wherein said diamide is N,N'-ethylene bis-stearamide.

5. An article of manufacture in accordance with claim 1 wherein said melt-blended polymer contains from about 10% up to about 50% by weight of polyester.

6. A spinnable composition comprising a fiber-forming polyamide having dispersed therein about 30 parts by weight of a fiber-forming polyester together with about 0.5 part by weight of a wax-like spinning aid which is a diamide derived by the reaction of an aliphatic carboxylic acid and a diamine and further characterized by the presence of a straight chain, saturated acyl group having from 12 to 22 carbon atoms in the hydrocarbon chain, all parts by weight being based on the total weight of the composition.

7. In a process of spinning a composition comprising a fiber-forming polyamide having dispersed therein about 30 parts by weight of a fiber-forming polyester the step which comprises adding about 0.5 part of a wax-like spinning aid which is a diamide derived the reaction of an aliphatic carboxylic acid and a diamine and further characterized by the presence of a straight chain, saturated acyl group having from 12 to 22 carbon atoms in the hydrocarbon chain, all parts by weight being based on the total weight of the composition.

8. A spinnable composition comprising
    a fiber-forming polyamide having dispersed therein a fiber-forming polyester the fiber-forming polyamide being present to the extent of at least 60 parts
    together with from about 0.1% to about 2% based on the weight of polyamide of a wax-like spinning aid comprising a diamide derived by the reaction of an aliphatic carboxylic acid containing 12 to 22 carbon atoms and an alkylene diamine containing 2–12 carbon atoms
all parts by weight being based on 100 parts by total weight of the composition.

9. A composition according to claim 8 wherein
    the polyamide is polycaprolactam,
    the polyester is polyethylene terephthalate,
    the composition contains 30 parts of polyester therein,
    the diamide is N,N'-ethylene bis-stearamide and the composition contains 0.5 part of the diamide.

10. In a process of spinning a composition comprising a fiber-forming polyamide having dispersed therein a fiber-forming polyester the fiber-forming polyamide being present to the extent of at least 60 parts the step which comprises adding from about 0.1% to about 2% based on the weight of polyamide of a wax-like spinning aid comprising a diamide derived by the reaction of an aliphatic carboxylic acid containing 12 to 22 carbon atoms and an alkylene diamine containing 2–12 carbon atoms all parts by weight being based on 100 parts by total weight of the composition.

11. Process according to claim 10, wherein
the polyamide is polycaprolactam,
the polyester is polyethylene terephthalate,
the composition contains 30 parts of polyester therein,
the diamide is N,N'-ethylene bis-stearamide and the composition contains 0.5 part of the diamide.

12. A melt-blended spinnable composition comprising
(a) at least 60% of fiber-forming nylon;
(b) from about 0.1% up to about 2% by weight of a waxy, thermally stable diamide which is relatively incompatible with said nylon, said diamide being selected from the group consisting of:

(i)

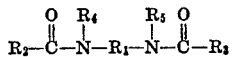

and
(ii)

wherein:
$R_1$ is an alkylene group of from 2 to 12 carbons, $R_2$ and $R_3$ are separately selected from the group consisting of alkyl, aralkyl and alicyclic groups free from substantial ethylenic unsaturation and containing from 2 to 30 carbons, and $R_4$ and $R_5$ are separately selected from the group consisting of hydrogen, methyl, $R_2$ and $R_3$, (c) the balance of said polymer composition comprising polymeric material compatible with said nylon;

said polymeric material having been in its polymerized form at the time of the melt-blending of said diamide and said polymeric material, and said composition, after spinning, being capable of being drawn at a draw ratio exceeding the draw ratio at break of the base polymer composition not so melt-blended, to yield drawn products having a tensile strength as a result of said drawing operation greater than is obtainable from the base polymer composition not so melt-blended.

13. Composition according to claim 12 wherein the composition consists essentially of said nylon and said diamide.

References Cited
UNITED STATES PATENTS

| | | | |
|---|---|---|---|
| 3,342,762 | 9/1967 | Crovalt, Jr. | 260—78 S |
| 3,134,746 | 5/1964 | Grabowski | 260—880 R |
| 2,948,698 | 8/1960 | Cocci | 260—78 S |

MORRIS LIEBMAN, Primary Examiner

S. L. FOX, Assistant Examiner

U.S. Cl. X.R.

260—326 N, 78 S, 857

PO-1050
(5/69)

UNITED STATES PATENT OFFICE
CERTIFICATE OF CORRECTION

Patent No. 3,801,521     Dated April 2, 1974

Inventor(s) Walter J. Smith and John R. Bukey

It is certified that error appears in the above-identified patent and that said Letters Patent are hereby corrected as shown below:

In Column 2, Line 56, the word "Monomers" should be underlined.

In Column 2, Line 58, the word "without" should be underlined.

In Column 5, Line 66, the period should be a comma.

In Column 8, Line 23, Claim 1, insert the word --the-- before "drawing".

Signed and sealed this 26th day of November 1974.

(SEAL)
Attest:

McCOY M. GIBSON JR.
Attesting Officer

C. MARSHALL DANN
Commissioner of Patents